United States Patent
Dudar

(10) Patent No.: US 11,333,096 B2
(45) Date of Patent: May 17, 2022

(54) AMBIENT TEMPERATURE SENSOR RATIONALITY CHECK

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 374 days.

(21) Appl. No.: 15/884,040

(22) Filed: Jan. 30, 2018

(65) Prior Publication Data
US 2019/0234337 A1 Aug. 1, 2019

(51) Int. Cl.
F02D 41/22 (2006.01)
F02M 35/10 (2006.01)
B60R 16/023 (2006.01)
F02B 39/10 (2006.01)
B60W 20/50 (2016.01)
F02D 41/04 (2006.01)
F02D 41/00 (2006.01)

(52) U.S. Cl.
CPC ........ F02D 41/222 (2013.01); B60R 16/0237 (2013.01); F02B 39/10 (2013.01); F02M 35/1038 (2013.01); F02M 35/10222 (2013.01); B60W 20/50 (2013.01); F02D 41/0007 (2013.01); F02D 41/042 (2013.01); F02D 2200/021 (2013.01); F02D 2200/0414 (2013.01)

(58) Field of Classification Search
CPC .............. F02D 41/222; F02D 41/0007; F02D 41/0037; F02D 41/042; F02D 2200/021; F02D 2200/0414; F02B 39/10; F02M 35/1038; F02M 35/10222; F02M 35/10373; B60R 16/0237; B60W 20/50
See application file for complete search history.

(56) References Cited

U.S. PATENT DOCUMENTS 1,670,550 A 5/1928 Putnam
4,122,679 A 10/1978 Charron
(Continued)

FOREIGN PATENT DOCUMENTS

JP 2010138796 A 6/2010

OTHER PUBLICATIONS

Dudar, A., "Systems and Methods for Heating a Vehicle Intake Manifold During Stop/Start Events," U.S. Appl. No. 15/828,844, filed Dec. 1, 2017, 66 pages.
(Continued)

Primary Examiner — Christian Chace
Assistant Examiner — Michael F Whalen
(74) Attorney, Agent, or Firm — Geoffrey Brumbaugh; McCoy Russell LLP

(57) ABSTRACT

Methods and systems are provided for diagnosing temperature sensors of a vehicle. In one example, a method may include, at a duration after an engine-off event, determining that an intake air temperature measured by an intake air temperature sensor of the vehicle is greater than an ambient air temperature measured by an ambient air temperature sensor of the vehicle. In response to the determining, the method may include flowing ambient air across the intake air temperature sensor, and indicating the ambient air temperature sensor is functional responsive to the intake air temperature converging to the ambient air temperature during the flowing.

15 Claims, 8 Drawing Sheets

(56) References Cited

U.S. PATENT DOCUMENTS

| | | | |
|---|---|---|---|
| 4,404,931 A | 9/1983 | Smith et al. | |
| 5,655,506 A | 8/1997 | Hollis | |
| 6,964,269 B2 | 11/2005 | Gschwind et al. | |
| 7,797,993 B2* | 9/2010 | McLain | F02D 41/187 |
| | | | 73/114.31 |
| 9,114,796 B2 | 8/2015 | Martin et al. | |
| 9,766,138 B2* | 9/2017 | Jochemczyk | G01K 1/20 |
| 9,896,089 B2* | 2/2018 | Styles | B60W 30/00 |
| 10,145,340 B1* | 12/2018 | Dudar | F01N 9/00 |
| 10,471,966 B2* | 11/2019 | Dudar | B60W 10/22 |
| 2004/0173012 A1* | 9/2004 | Tsukamoto | F01P 11/16 |
| | | | 73/114.71 |
| 2006/0064232 A1* | 3/2006 | Ampunan | B60T 7/16 |
| | | | 701/115 |
| 2006/0287806 A1* | 12/2006 | Hori | G01D 3/08 |
| | | | 701/114 |
| 2008/0196487 A1* | 8/2008 | Suzuki | F02D 41/062 |
| | | | 73/114.34 |
| 2009/0078033 A1* | 3/2009 | Iwai | F02D 41/222 |
| | | | 73/114.34 |
| 2009/0138154 A1* | 5/2009 | McLain | F02D 41/187 |
| | | | 701/29.2 |
| 2009/0182489 A1 | 7/2009 | Yang et al. | |
| 2010/0269802 A1* | 10/2010 | Nakashima | G01K 15/00 |
| | | | 123/568.21 |
| 2012/0051388 A1* | 3/2012 | Hamama | F02D 41/222 |
| | | | 374/1 |
| 2015/0142338 A1* | 5/2015 | Nakano | F02D 41/0065 |
| | | | 702/35 |
| 2015/0285176 A1* | 10/2015 | Kubota | F02D 41/222 |
| | | | 73/114.34 |
| 2016/0273975 A1* | 9/2016 | Tano | G01K 15/007 |
| 2017/0130664 A1* | 5/2017 | Rueger | F02B 39/10 |
| 2019/0135270 A1* | 5/2019 | Dudar | B60W 40/08 |
| 2019/0232951 A1* | 8/2019 | Dudar | F02D 41/222 |

OTHER PUBLICATIONS

Dudar, A. et al., "Ambient Temperature Sensor Rationality Check," U.S. Appl. No. 15/884,110, filed Jan. 30, 2018, 58 pages.

* cited by examiner

US 11,333,096 B2

AMBIENT TEMPERATURE SENSOR RATIONALITY CHECK

FIELD

The present description relates generally to methods and systems for an ambient temperature sensor of a vehicle.

BACKGROUND/SUMMARY

Vehicles may be configured with an intake air temperature sensor for estimating a temperature of fresh air entering a vehicle engine. Based on the intake air temperature, air mass and/or air volume estimations may be made, which may then be used for air-to-fuel ratio control. Likewise, vehicles may be configured with an ambient air temperature sensor for estimating a temperature of air surrounding the vehicle. Based on the ambient air temperature sensor, fuel system evaporative leak test thresholds may be adjusted. Both the intake air temperature sensor and the ambient air temperature sensor may need to be periodically diagnosed to ensure proper functionality.

One example approach for diagnosing an intake air temperature sensor is shown by Martin et al. in U.S. Pat. No. 9,114,796. Therein, a rationality check between the intake air temperature sensor and an engine temperature sensor may be performed following an engine soak. If the temperature measurements from the intake air temperature sensor and the engine temperature sensor do not agree, the vehicle speed at which an automatic engine shutoff is initiated may be lowered to prolong engine operation and thus the flow of intake air over the intake air temperature sensor. If the intake air temperature sensor still disagrees with the engine temperature, the intake air sensor may be determined to be degraded.

However, the inventors herein have recognized potential issues with such systems. As one example, such an approach does not address the rationality of the ambient air temperature sensor. Even if the ambient air temperature sensor were to be rationalized based on the intake air temperature sensor and the engine temperature sensor following the engine soak (when all sensors conceivably measure the same ambient temperature), the ambient air temperature sensor is typically located on an external component of the vehicle (such as under a side mirror) and as such may be differentially affected by environmental factors and/or not exposed to the same rejected engine heat as the internally-located intake air temperature sensor and engine temperature sensor. Further still, by requiring a subsequent engine start and subsequent duration of engine operation to confirm the rationality of the intake air temperature sensor, the approach of Martin may unduly delay accurate diagnosing of the sensors, particularly in hybrid vehicles where the engine may be operated infrequently.

In one example, the issues described above may be addressed by a method for a vehicle. The method may include, at a duration after an engine-off event, determining that an intake air temperature measured by an intake air temperature sensor of the vehicle is greater than an ambient air temperature measured by an ambient air temperature sensor of the vehicle. The method may further include, in response to the determining, flowing ambient air across the intake air temperature sensor and indicating the ambient air temperature sensor is functional responsive to the intake air temperature converging to the ambient air temperature during the flowing. In this way, divergence between the intake air temperature sensor and the ambient air temperature sensor may be confirmed as being due to rejected engine heat (to which the intake air temperature sensor, but not the ambient air temperature sensor, may be exposed) rather than a degraded sensor. If the intake air temperature does not converge with the ambient air temperature, the intake air temperature sensor may be determined to be degraded. As one example, the ambient air may be flowed over the intake air temperature sensor by activating an electric booster positioned in an intake passage upstream of the intake air temperature sensor. Further, in some examples, rationality of the ambient air temperature sensor may be confirmed by obtaining an ambient temperature in the vicinity of the vehicle (e.g., from a weather service and/or from ambient air temperature sensors of nearby vehicles) and comparing it to the ambient air temperature measured by the ambient air temperature sensor.

By ruling out environmental or internal sources of excess heat that may be present at the time of the rationality check, false positive identifications of sensor degradation may be reduced. Further, by relying on an engine component that may be operated independent of the engine to supply the ambient air to the intake air temperature sensor, operation of the engine to confirm the functionality of the intake air temperature sensor may be reduced or avoided, thus allowing for engine controls based on the intake air temperature sensor output to be adjusted, even at engine start-up, if sensor degradation is determined.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
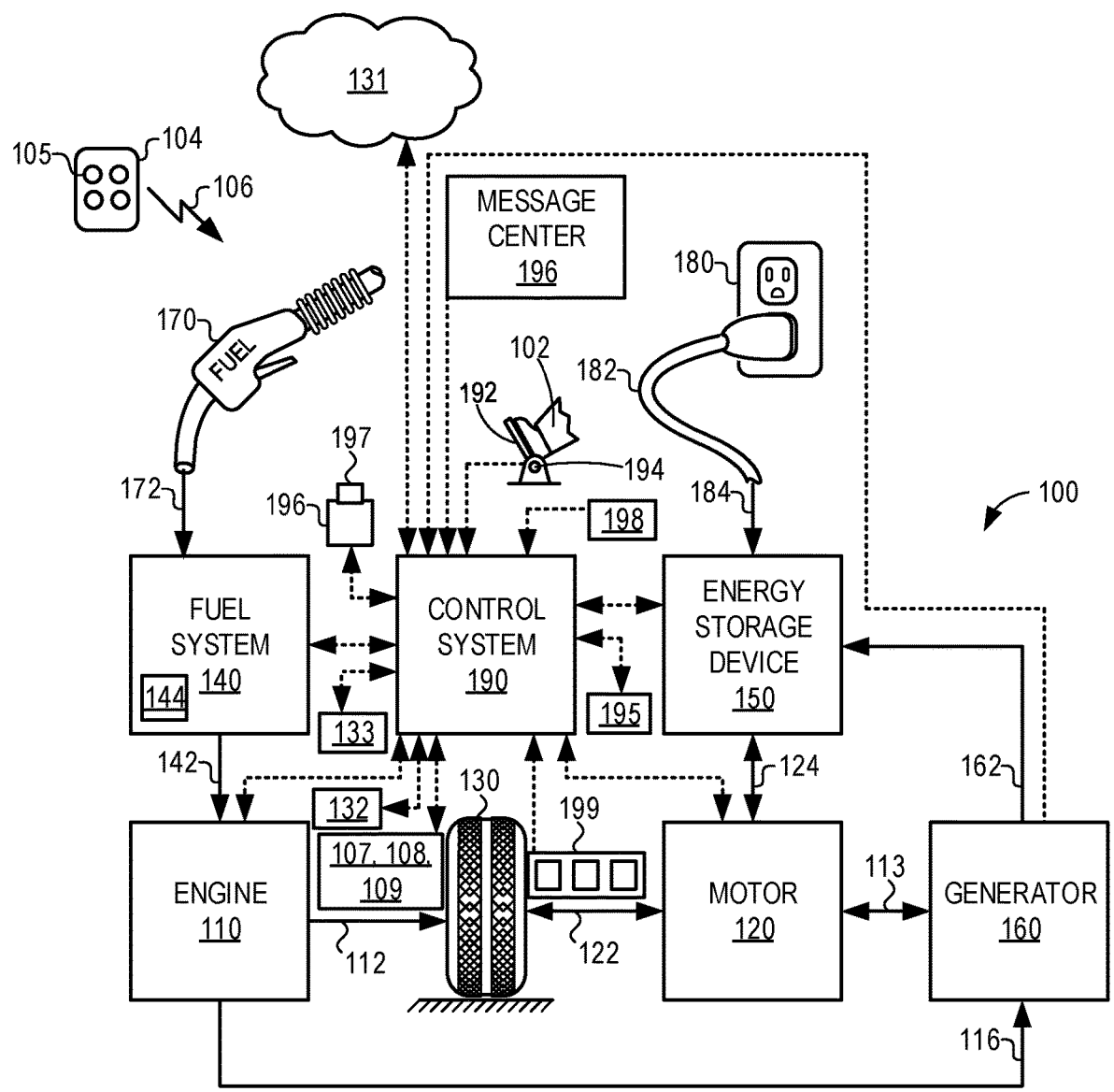
FIG. 1 schematically shows an example hybrid vehicle propulsion system.

The following description relates to systems and methods for confirming the functionality of an ambient air temperature (AAT) sensor and an intake air temperature (IAT) sensor after a soak period following an engine shut-off. The output from the AAT sensor may be displayed as the outside air temperature on the vehicle dash and may be used in many engine controls and diagnostics. For example, the evaporative emissions leak diagnostic may use the AAT sensor output to adjust its pass/fail thresholds. Furthermore, the leak diagnostic is most accurate if performed during a particular temperature window, such as 40-95° F. Given the location of the AAT sensor, which may be on an external component of the vehicle such as a side mirror, the AAT sensor may be prone to inflated temperature readings due to solar loading on the AAT sensor. If the actual ambient temperature is 30° F. but sun loading of the AAT sensor is causing the AAT sensor to read 45° F., then the leak diagnostic will execute during conditions where an accurate determination of leaks may not be possible. Cold start strategy engine controls also use the AAT sensor output to determine how much to enrich the air-fuel ratio during cold starts. Overestimating the AAT reading at cranking due to sun loading may result in prolonged start times and increased emissions.

The AAT sensor is typically rationalized by comparing its output to other engine temperature sensors after a cold soak of about six hours (e.g., after the engine has been off for six hours without an intervening engine start). After a long engine-off soak, the AAT, engine coolant temperature (ECT), and IAT should all be convergent. If the AAT mismatches the ECT and IAT, then it fails the rationality test and a diagnostic code sets. The rationale is that if two (e.g., ECT, IAT) of the three sensors converge and one is an outlier (e.g., AAT), then the outlier is the irrational sensor. However, in certain vehicles with low ground clearance, even after a six hour soak, the three temperature sensors may not converge due to stack-up of low clearance and underbody shields. In other words, engine heat may cause the IAT sensor and ECT sensor to output artificially high temperature readings, erroneously casting the AAT sensor as being irrational.

Thus, according to embodiments disclosed herein, divergence among the output of the three temperature sensors due to a degraded sensor may be differentiated from divergence among the three temperature sensors due to external solar loading or internal heat rejection. For example, if the rationality test indicates that the AAT sensor is outputting an ambient air temperature reading that is lower than the temperature measured by the IAT sensor (and the ECT sensor, at least in some examples), the IAT sensor being degraded may be ruled out by flowing ambient air over the IAT sensor. If the temperature measured by the IAT sensor then converges with the temperature measured by the AAT sensor, the IAT sensor may be deemed rational. In another example, if the rationality test indicates that the AAT sensor is outputting an ambient air temperature reading that is higher than the temperature measured by the IAT sensor (and the ECT sensor, at least in some examples), the IAT sensor being degraded may be ruled out by heated air over the IAT sensor. If the temperature measured by the IAT sensor then converges with the temperature measured by the AAT sensor, the IAT sensor may be deemed rational. Such approaches may cause the AAT sensor and the IAT to be in agreement, but cast the ECT sensor as an outlier. However, the ECT, owing to the larger thermal mass of the coolant, may not be expected to change in temperature as quickly and thus may be confirmed as rational during a subsequent engine operation.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 113 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in detail below, motor 120 may in some examples be utilized to spin or rotate the motor in an unfueled configuration. More specifically, motor 120 may rotate the engine unfueled, using power from onboard energy storage device 150, which may include a battery, for example. In a case where motor 120 is used to rotate the engine unfueled, fuel injection to engine cylinders may be prevented, and spark may not be provided to each of the engine cylinders.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

The vehicle system 100 may include a human machine interface (HMI) 133 coupled to the vehicle dashboard via which an operator may communicate with the control system 190. The HMI 133 may include a touch-sensitive display screen.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In one example, information received from the GPS may be utilized in conjunction with route learning methodology, such that routes commonly traveled by a vehicle may be learned by the vehicle control system 190. In some examples, other sensors, such as lasers, radar, sonar, acoustic sensors, etc., may be additionally or alternatively utilized in conjunction with the onboard navigation system to conduct route learning of commonly traveled routes by the vehicle.

Vehicle system 100 may also include sensors dedicated to indicating the occupancy-state of the vehicle, for example seat load cells 107, door sensing technology 108, and onboard cameras 109.

Figure 2:
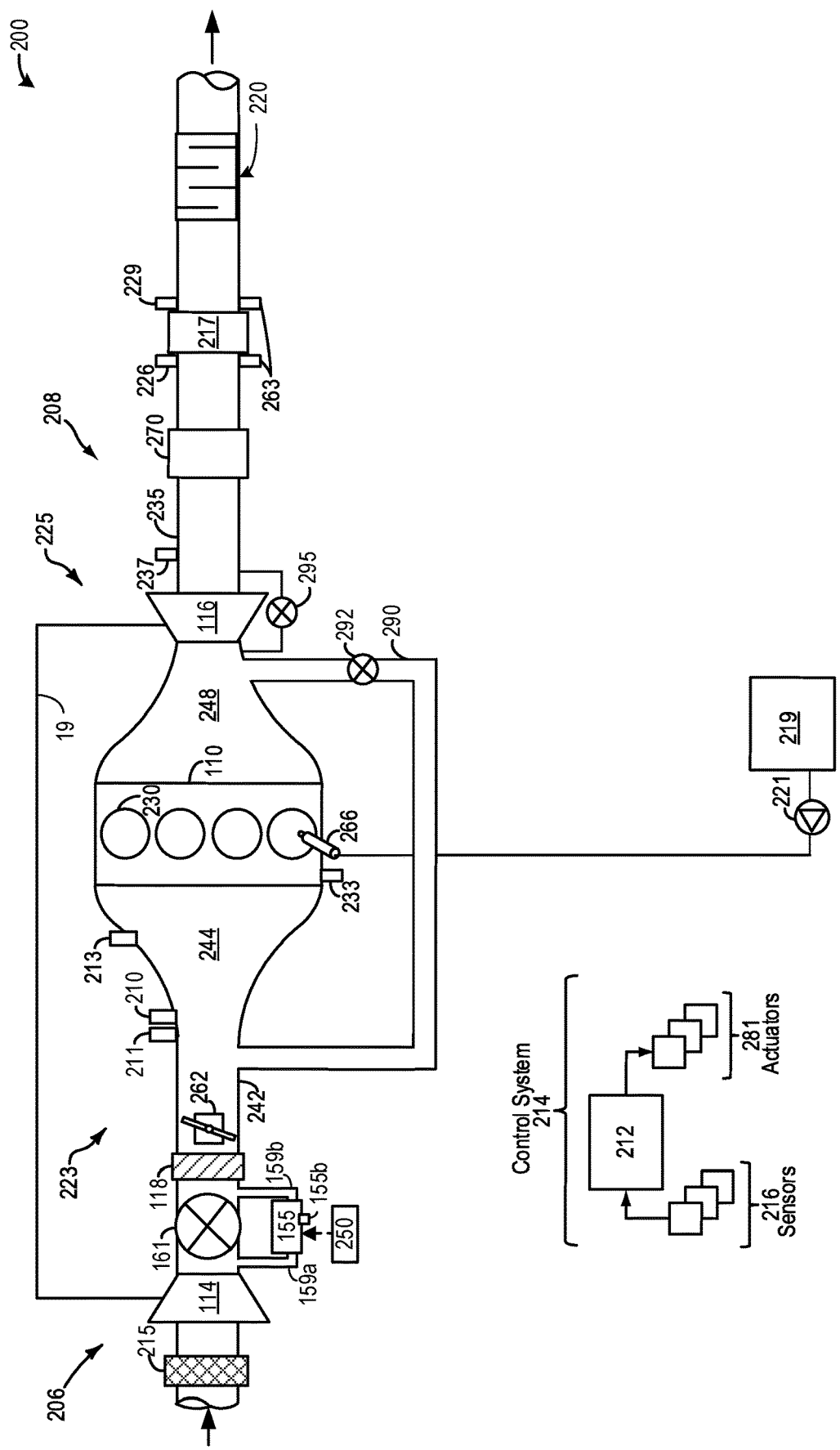
FIG. 2 schematically shows an example vehicle system with an electric booster.

FIG. 2 shows a schematic depiction 200 of a vehicle system 206. Vehicle system 206 is a non-limiting example of vehicle system 100 depicted at FIG. 1. The vehicle system 206 includes an engine system 208 coupled to a fuel system 219. It may be understood that fuel system 219 may comprise the same fuel system as fuel system 140 depicted at FIG. 1. In some examples, vehicle system 206 may be a hybrid electric vehicle system.

The engine system 208 may include an engine 110 having a plurality of cylinders 230. While not explicitly shown, it may be understood that each cylinder may include one or more intake valve(s) and one or more exhaust valve(s). The engine 110 includes an engine air intake 223 and an engine exhaust 225. The engine air intake 223 includes a throttle 262 in fluidic communication with engine intake manifold 244 via an intake passage 242. The throttle 262 may comprise an electronic throttle, which may be controlled via the vehicle controller sending a signal to actuate the throttle to a desired position. In such an example where the throttle is electronic, power to control the throttle to the desired position may be from an onboard energy storage device (e.g. 150), such as a battery. Further, engine air intake 223 may include an air box and intake filter 215 positioned upstream of throttle 262.

In the depicted embodiment, engine 110 is a boosted engine coupled to a turbocharger including a compressor 114 driven by a turbine 116. Specifically, fresh air is introduced along intake passage 242 into engine 110 via intake air filter 215 and flows to compressor 114. The compressor may be any suitable intake-air compressor, such as a motor-driven or driveshaft driven supercharger compressor. In engine system 110, the compressor is a turbocharger compressor mechanically coupled to turbine 116 via a shaft 19, the turbine 116 driven by expanding engine exhaust. The level of compression and hence amount of boost provided to the engine may controlled at least in part by a wastegate 295 coupled across the turbine 116. When the wastegate is open, some exhaust gas is allowed to bypass the turbine, lowering turbine speed. When closed, all exhaust gas from the engine passes through the turbine.

As shown in FIG. 2, compressor 114 is coupled through charge-air cooler (CAC) 118 to throttle valve 262. From the compressor, the compressed air charge flows through the charge-air cooler 118 and the throttle valve 262 to the intake manifold 244.

To assist the turbocharger, an electric booster 155 (eBooster) may be incorporated into the vehicle propulsion system. Electric booster 155 may be powered via an onboard energy storage device 250, which may comprise a battery, capacitor, supercapacitor, etc. In one example, electric booster 155 may be activated (actuated on) in response to a demand for wheel torque, in order to provide the desired boost air rapidly to the engine without delay as may otherwise occur if the turbocharger was utilized without the electric booster. In such an example, responsive to the turbocharger spooling up to a threshold speed (e.g. 70,000 rpm), the electric booster 155 may be actuated off, or deactivated. More specifically, operational control of the electric booster 155 may be under control of the vehicle controller (e.g. controller 12). For example, the controller may send a signal to an electric booster actuator 155b, which may actuate on the electric booster. In another example, the controller may send a signal to the electric booster actuator 155b, which may actuate off the electric booster. In one example the electric booster actuator may comprise a motor which drives the compression of air.

Electric booster 155 may be positioned between a first electric booster conduit 159a, and a second electric booster conduit 159b. First electric booster conduit 159a may fluidically couple intake passage 42 to electric booster 155 upstream of electric booster bypass valve 161. Second electric booster conduit 159b may fluidically couple electric booster 155 to intake passage 42 downstream of electric booster bypass valve 161. As an example, air may be drawn into electric booster 155 via first electric booster conduit 159a upstream of electric booster bypass valve 161, and compressed air may exit electric booster 155 and be routed via second electric booster conduit to intake passage 42 downstream of electric booster bypass valve 161. In this way, compressed air may be routed to engine intake 244.

In circumstances where the electric booster 155 is activated to provide boost more rapidly than if the turbocharger were solely relied upon, it may be understood that electric booster bypass valve 161 may be commanded closed while electric booster 155 is activated. In this way, intake air may flow through turbocharger and through electric booster 155. Once the turbocharger reaches the threshold speed, the electric booster 155 may be turned off, and the electric booster bypass valve 161 may be commanded open. In one example, when the engine is rotated in a reverse direction, the electric booster may also be rotated in a direction opposite to the default direction of rotation in order to create an air flow from the exhaust passage to the engine cylinders 230.

The engine exhaust system 225 includes an exhaust manifold 248 leading to an exhaust passage 235 that routes exhaust gas to the atmosphere. The engine exhaust system 225 may include one or more emission control devices, including exhaust catalyst 270 (which may be a three-way catalyst), which may be mounted in a close-coupled position in the exhaust. One or more additional emission control devices may include a lean NOx trap, diesel particulate filter, oxidation catalyst, etc.

It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Alternatively, MAP may be inferred from alternate engine operating conditions, such as mass air flow (MAF), as measured by MAF sensor 210 coupled to the intake manifold.

Engine exhaust system 225 may further include a gasoline particulate filter (GPF) 217. GPF 217 may comprise a particulate filter, hydrocarbon trap, a catalyzed wash coat, or combination thereof. In some examples, during operation of engine 110, GPF 217 may be periodically regenerated by operating at least one cylinder of the engine within a particular air-fuel ratio to increase a temperature of GPF 217, such that retained hydrocarbons and soot particles may be oxidized.

In some examples, temperature sensor 226 may be positioned upstream from the inlet of GPF 217 and temperature sensor 229 may be positioned downstream of GPF 217. Temperature sensors 226 and 229 may be used to assess the temperature of GPF 217 for regeneration purposes, for example. Furthermore, pressure in the exhaust system may be assessed by pressure sensor 263. Pressure sensor 263 may be a differential pressure sensor positioned upstream and downstream of GPF 217, for example. Pressure sensor 263 may be used to determine pressure at the inlet of GPF 217 in order to assess operating conditions for air to be introduced to the inlet of GPF 217 for regeneration. Furthermore, in some examples, a soot sensor may be positioned downstream of GPF 217, to assess the level of soot that is released from GPF 217.

A muffler 220 is also positioned downstream of the GPF 217. Muffler 220 may reduce the amplitude of sound pressure created by the exhaust gases prior to their exit into the atmosphere. The exhaust gases may pass through one or more chambers or other sound-reducing structures within the muffler 220 before exiting the muffler via a muffler outlet to the tailpipe 231 of the exhaust system en route to atmosphere.

Vehicle system 206 further includes an exhaust gas recirculation (EGR) system including an EGR passage 290 coupling exhaust passage 235 to intake passage 242. The EGR system shown in FIG. 2 is a high-pressure EGR system, where the EGR passage 290 is coupled to the exhaust passage 235 upstream of turbine 116 and is coupled to intake passage 242 downstream of compressor 114. Control of the flow of gas through the EGR passage 290 is provided by an EGR valve 292 positioned in the EGR passage 290.

Fuel system 219 may include a fuel tank coupled to a fuel pump system 221. It may be understood that fuel tank may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 219 may be a return-less fuel system, a return fuel system, or various other types of fuel system. Fuel tank may hold a plurality of fuel blends, including fuel with a range of alcohol concentrations, such as various gasoline-ethanol blends, including E10, E85, gasoline, etc., and combinations thereof.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, pressure sensor 263 coupled across the particulate filter 217, GPF temperature sensors 226 and 229, MAP sensor 213, and MAF sensor 210. Other sensors such as pressure, temperature, air/fuel ratio, and composition sensors may be coupled to various locations in the vehicle system 206. For example, an intake air temperature sensor 211 may be positioned in the intake passage or intake manifold and configured to measure a temperature of the intake air before the intake air is inducted into the engine. An engine temperature sensor 233 may be positioned in a cooling sleeve of the engine, for example, in order to measure engine temperature (e.g., engine coolant temperature). As another example, the actuators may include throttle 262, EGR valve 292, wastegate 295, and electric booster actuator 155b. The controller may receive input data from the various sensors, process the input data, and trigger the actuators in response to the processed input data based on instruction or code programmed therein corresponding to one or more routines.

In one example, during an engine-off condition, the controller may opportunistically carry out a diagnostic method for confirming the functionality of three vehicle temperature sensors, the ambient air temperature (AAT) sensor 198, intake air temperature (IAT) sensor 211, and engine coolant temperature (ECT) sensor 233. The diagnostic method may include comparing the temperature measured by each of the sensors. If one of the temperatures diverges from the other two temperatures, the sensor outputting the divergent temperature may be indicated as being degraded. However, in some conditions a divergent temperature reading may be due to the different environment each sensor is located in. To rule out varying environmental effects, the diagnostic method may confirm functionality of the AAT sensor via crowd-sourced temperatures and/or by performing the diagnostic during certain conditions (e.g., at night). The diagnostic method may further confirm the functionality of the IAT sensor by purposely heating or cooling the IAT sensor. For example, to purposely cool the IAT sensor during conditions where the IAT sensor may be exposed to rejected engine heat, the controller may send a signal to the electric booster actuator 155b to rotate the electric booster to flow in ambient air via the intake passage and the controller may monitor the intake air temperature via the IAT sensor 211. In another example, to purposely heat the IAT sensor during conditions where the AAT sensor 198 may be exposed to sun loading, the controller may send a signal to motor 120 to rotate the engine in a reverse direction to flow in ambient air via the tailpipe and catalyst 270 while monitoring the intake air temperature via the IAT sensor 211.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

A wakeup capability may enable a circuit to wake the controller in order to opportunistically conduct diagnostics of the various temperature sensors (e.g., ambient, engine, and intake air). During a vehicle key-off condition, a timer may be set, for four to six hours for example. Upon expiration of the timer, if an intervening engine-on event has not occurred, the circuit may wake the controller to conduct the diagnostic routines described herein.

Figure 3A:
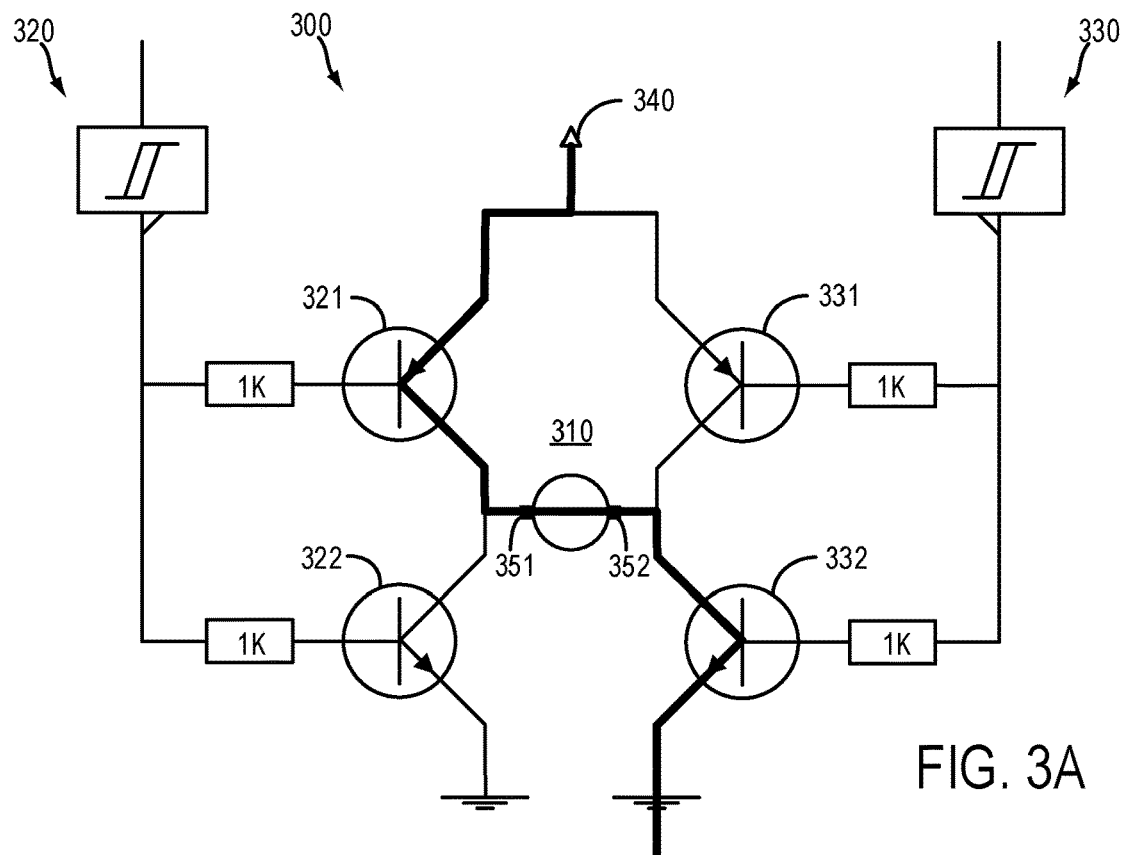
FIGS. 3A and 3B schematically shows an example H-bridge circuit which may be used to rotate a vehicle engine in a forward or reverse direction.
Figure 3B:
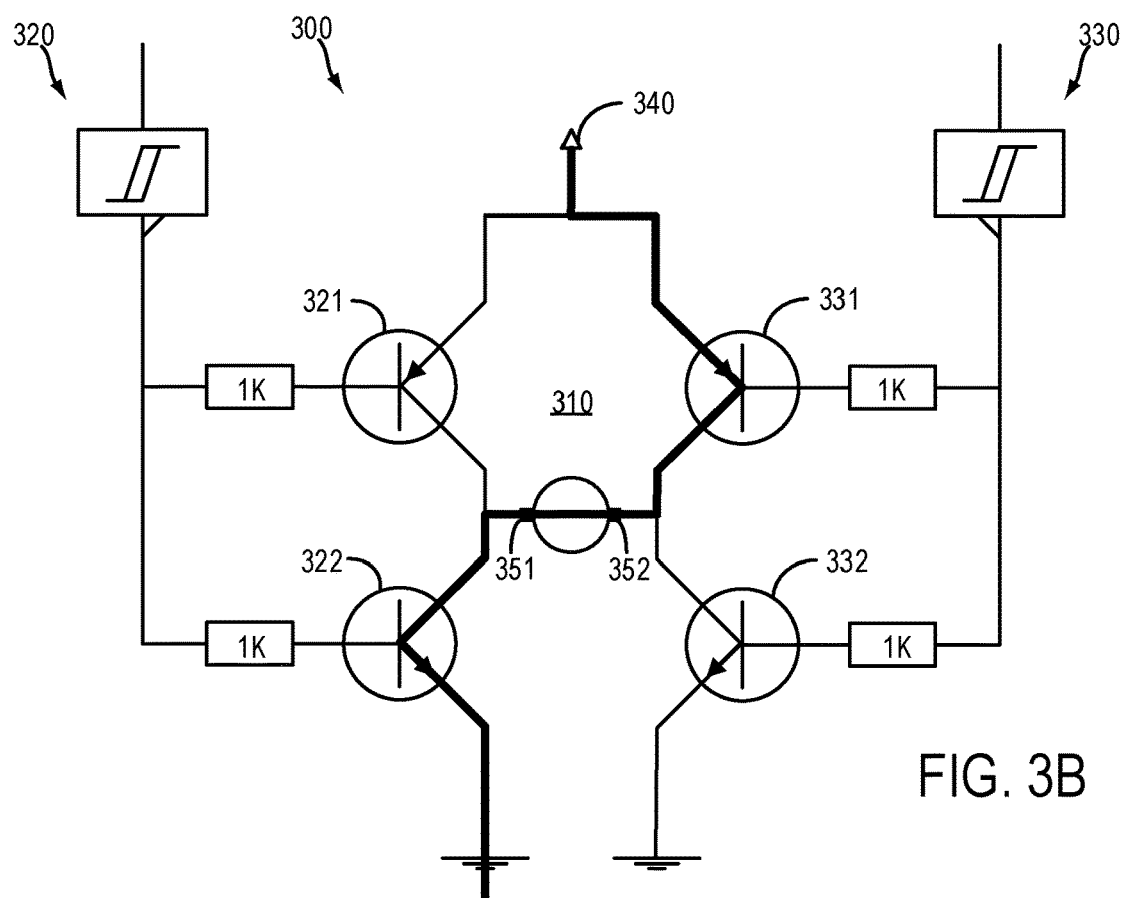

FIGS. 3A and 3B show an example circuit 300 that may be used for reversing a spin orientation of an electric motor. Circuit 300 schematically depicts an H-Bridge circuit that may be used to run a motor 310 in a first (forward) direction and alternately in a second (reverse) direction. Circuit 300 comprises a first (LO) side 320 and a second (HI) side 330. Side 320 includes transistors 321 and 322, while side 330 includes transistors 331 and 332. Circuit 300 further includes a power source 340.

In FIG. 3A, transistors 321 and 332 are activated (energized), while transistors 322 and 331 are off. In this configuration, the left lead 351 of motor 310 is connected to power source 340, and the right lead 352 of motor 310 is connected to ground. In this way, motor 300 may run in a forward (or default) direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. It may be understood that in some examples, the engine may be spun in the forward (e.g. default) direction under conditions where the vehicle is stationary and it is desired only for the engine to be spun or rotated in the forward direction, without combustion.

In FIG. 3B, transistors 322 and 331 are activated (energized), while transistors 321 and 332 are off. In this configuration, the right lead 352 of motor 310 is connected to power source 340, and the left lead 351 of motor 310 is connected to ground. In this way, motor 310 may run in a reverse direction.

Figure 4:
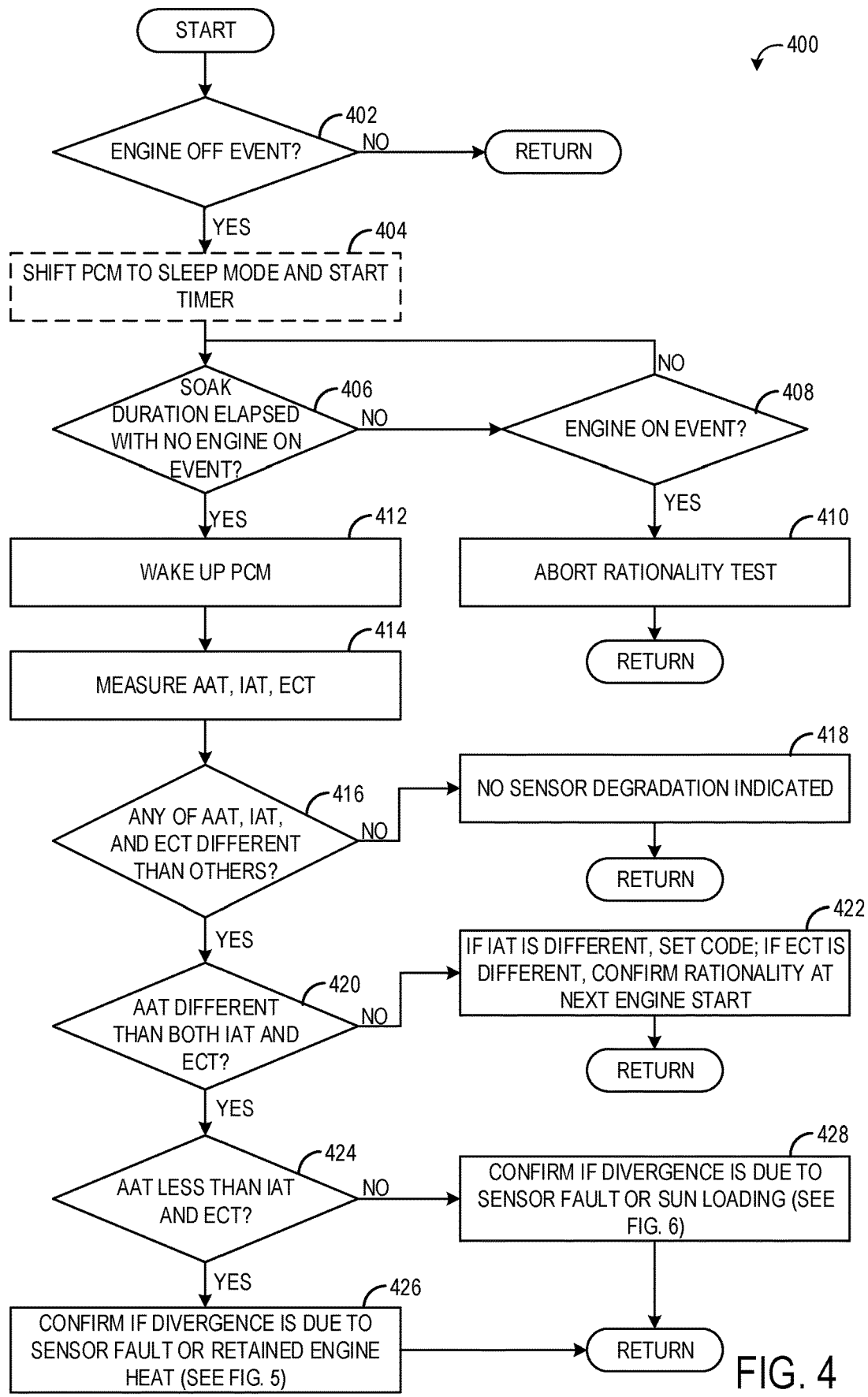
FIG. 4 is a flow chart illustrating a method for performing an air temperature rationality check.

Turning to FIG. 4, a method 400 for performing a rationality check on various vehicle temperature sensors is illustrated. Instructions for carrying out method 400 and the rest of the methods included herein may be executed by a controller, such as controller 212, based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, method 400 includes determining if an engine-off event has occurred. An engine-off event may include a vehicle in which the engine is installed being shut off, such as via an operator-initiated vehicle-off event. A vehicle-off event may be confirmed in response to a key-off condition where the vehicle includes an active key, a stop button actuated condition where the vehicle includes an ignition start/stop button, and a passive key being outside a threshold distance of the vehicle where the vehicle includes a passive key. In other example, an engine-off event may include the engine being deactivated while the vehicle is propelled by an electric motor, for example. If an engine-off event is not detected, method 400 returns to continue monitoring for an engine-off event. If an engine-off event is detected, method 400 proceeds to 404 to shift the powertrain control module (PCM, also referred to as the controller) to sleep mode and start a timer. The sleep mode may reduce vehicle-off energy consumption by on-board sensors, auxiliary components, and diagnostics. However, if the vehicle is being propelled by the motor and the engine is off, the PCM may be maintained in an awake mode.

At 406, method 400 includes determining if a soak duration has elapsed since the engine-off event with no engine-on event. For example, the method may include determining whether a time duration d1 has passed on the timer that was started at 404. The duration d1 may be sufficiently long (such as a 4-6 hours) to allow stabilization of engine and intake temperatures to ambient temperature.

If the vehicle has not been in an engine-off condition lasting the duration d1, it may be determined if an engine-on event has occurred at 408. If yes, then at 410, the rationality check may be aborted and the method returns. In such an example, the timer may be reset and may not be set again until another engine-off event occurs. If no engine-on event has occurred, the method loops back to 406 to continue to determine if the soak duration has elapsed. If the soak duration has elapsed, without an intervening engine-on event, method 400 proceeds to 412 to wake up the PCM. For example, upon expiration of the timer without an engine-on event, the PCM may be shifted from the sleep mode to a wake-up mode. At 414, method 400 includes measuring an ambient air temperature (AAT), intake air temperature (IAT), and engine coolant temperature (ECT) with appropriate sensors. For example, the AAT may be measured by an AAT sensor, such as AAT sensor 198. The AAT sensor may be positioned on an external component of the vehicle, such as a side mirror or door handle. In other examples, the AAT sensor may be positioned in an underbody position of the vehicle. The IAT may be measured by an IAT sensor (such as IAT sensor 211) positioned in an intake passage or intake manifold of the engine. In examples where the engine is turbocharged, the IAT sensor may be positioned downstream of the charge air cooler, in order to measure the temperature of the intake air as the air is inducted into the engine. The ECT may be measured by an ECT sensor, such as ECT sensor 233. The ECT sensor may be positioned in a cooling sleeve jacket of the engine block, for example, and may be positioned to measure the temperature of the coolant that has recirculated through the engine.

At 416, method 400 includes determining if any of the AAT, IAT, and ECT is different than the other measured temperatures. For example, the method may determine if the AAT is different than the IAT and/or the ECT by a threshold amount, such as 30° or 50° F. The method may likewise determine if the IAT is different than the ECT and/or AAT by the threshold amount and determine if the ECT is different than the AAT and/or IAT by the threshold amount.

If it is determined that none of the AAT, IAT, and ECT is different than the other temperatures, for example if the AAT sensor, IAT sensor, and ETC sensor are all outputting temperature measurements that are within 30-50° F. of each other, method 400 proceeds to 418 to indicate that no sensor degradation is present. Since all three sensors are measuring the relatively same temperature, it may be determined that all sensors are accurately measuring ambient temperature and thus all the sensors are functional. Method 400 then returns.

If it is determined at 416 that one of the AAT, IAT, and ECT is different, method 400 proceeds to 420 to determine if the AAT is different than the IAT and the ECT. If the AAT is not different than both the IAT and the ECT, one of the IAT sensor and the ECT sensor may be outputting a divergent temperature measurement, and it may be determined that the AAT is functional. Accordingly, following an answer of no at 420, method 400 proceeds to 422 to perform an action based on which temperature measurement is divergent. If the IAT is different than the AAT (and ECT), a diagnostic code may be set indicating the IAT sensor may be degraded. Further, the ECT may be indicated as being functional. When two of the temperature sensors are measuring the same temperature following the soak duration, it may be assumed that both sensors are accurately measuring ambient temperature. Thus, the IAT sensor outputting a different temperature than the AAT and ECT may be indicative of the IAT being stuck in range or measuring with a large offset, either of which may result in the IAT sensor as being considered degraded.

If the ECT is different than the AAT (and IAT), the functionality of the ECT may be confirmed at a next engine start and the IAT may be indicated as being functional. For example, the engine coolant may retain heat for longer than the intake passage or intake manifold owing to the thermal properties of the liquid coolant relative to air. As such, if the ECT is different than the IAT and the AAT, it may be desirable to confirm if the ECT is actually degraded (relative to the coolant retaining heat) by monitoring the change in ECT as measured by the ECT sensor during a subsequent engine start-up and following engine operation, where the ECT is expected to rise. If the ECT as measured by the ECT sensor does not increase following a subsequent engine start, the ECT sensor may be confirmed as being degraded. Method 400 then returns.

Figure 5:
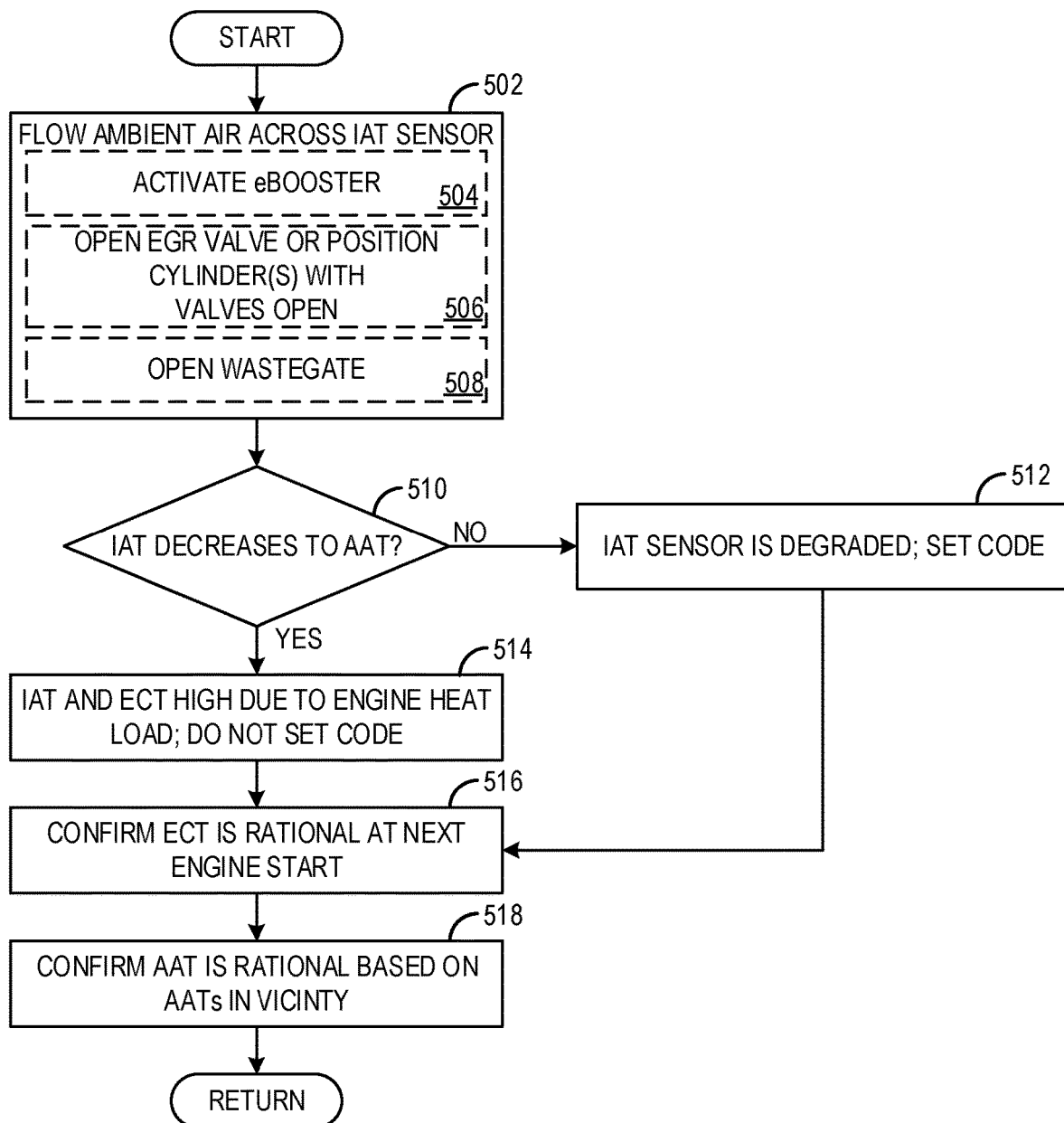
FIG. 5 is a flow chart illustrating a method for determining if air temperature sensor divergence is due to sensor degradation or retained engine heat.
Figure 6:
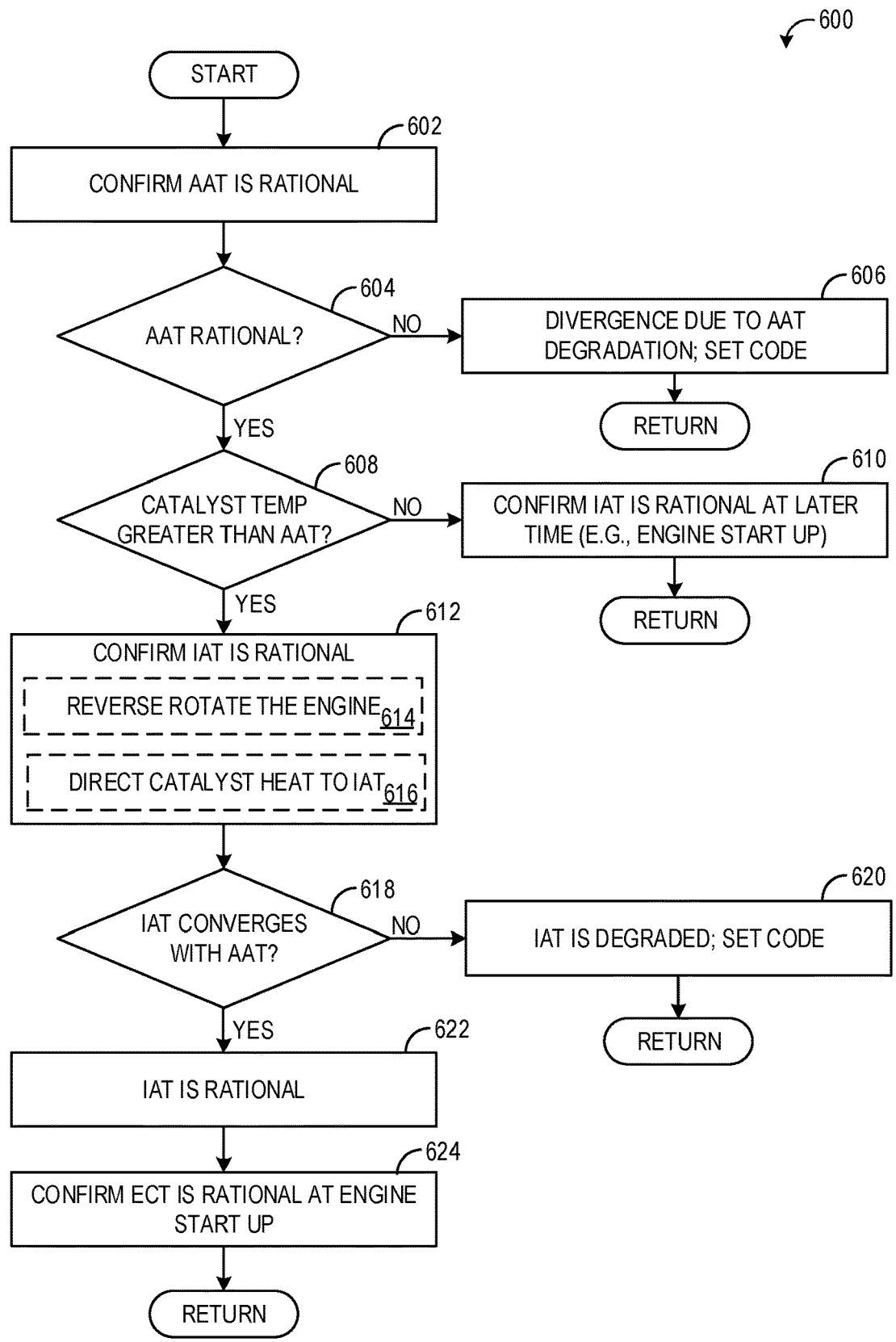
FIG. 6 is a flow chart illustrating a method for determining if air temperature sensor divergence is due to sensor degradation or retained sun loading.

Returning to 420, if it is determined that the AAT is different than both the IAT and the ECT, the AAT sensor may be degraded. However, because the AAT sensor is located relatively far from the IAT sensor and ECT sensor and is therefore exposed to different environmental effects than the IAT sensor and ECT sensor, divergence among the sensors that is due to the environmental effects rather than actual sensor faults may result in false positive determinations of AAT sensor degradation. Accordingly, if the AAT sensor is determined to be outputting a divergent temperature measurement, the divergence may be confirmed as being due to environmental effects rather than a sensor fault. To accomplish this, at 424, method 400 determines if the AAT as measured by the AAT sensor is less than the IAT and ECT. If the AAT is less than the IAT and ECT, method 400 proceeds to 426 to confirm if the divergence is due to a sensor fault or due to engine heat. The sensor fault or rejected engine heat may be confirmed by performing another method that is illustrated in FIG. 5 and explained in more detail below. If the AAT is not less than the IAT and ECT (e.g., the AAT is greater than the IAT and the ECT), method 400 proceeds to 428 to confirm if the divergence is due to a sensor fault or due to sun loading. The sensor fault or sun loading may be confirmed by performing another method that is illustrated in FIG. 6 and explained in more detail below.

FIG. 5 illustrates a method 500 for confirming if temperature measurement divergence among an AAT sensor, IAT sensor, and ECT sensor is due to one of the sensors being degraded or due to the IAT and ECT being exposed to heat from the engine. Method 500 may be performed in response to an initial rationality check performed on the sensors indicating that the AAT sensor is outputting a temperature measurement that is significantly less than the temperatures measured by the IAT sensor and ECT sensor. The lower temperature measurement from the AAT sensor may be due to the AAT sensor being degraded and thus inaccurately measuring ambient temperature, while the IAT sensor and ECT sensor are accurately measuring ambient temperature. However, even after a long engine-off soak (e.g., 4-6 hours) some vehicle configurations may still retain a relatively large amount of engine heat. This heat may cause the IAT sensor and the ECT sensor, but not the AAT sensor, to measure a temperature that is higher than ambient temperature. Thus, method 500 may be performed to confirm if a sensor is degraded or if the IAT and ECT sensors are being exposed to engine heat, thereby avoiding a false positive determination of sensor degradation.

At 502, method 500 includes flowing ambient air across the IAT sensor. If the IAT sensor is being exposed to retained engine heat, and hence is measuring a temperature higher than the AAT sensor, exposing the IAT sensor to ambient air should cause the IAT measured by the IAT sensor to drop until it converges with the AAT. Once the IAT converges (e.g., comes within a threshold temperature of the AAT, such as within 10° F.) with the AAT, the IAT sensor may be confirmed as being functional, and the AAT sensor may be vindicated as not having a sensor fault.

To flow ambient air across the IAT sensor, method 500 may activate an electric booster, as indicated at 504. The electric booster may be positioned in the intake passage upstream of the IAT sensor, such as electric booster 155. Upon activation, the electric booster may spin a compressor, resulting in ambient air being inducted into the intake passage, where the ambient air flows past the IAT sensor. To activate the electric booster, the controller may send a signal to turn on a motor coupled to the compressor of the electric booster. To allow adequate flow of ambient air and prevent stall/blockage of the flow at the engine, method 500 may open an exhaust gas recirculation (EGR) valve and/or position the engine such that one or more cylinders have both the intake and exhaust valves of the one or more cylinders open, as indicated at 506. For example, the engine may include a high-pressure EGR system that includes an EGR passage coupling the exhaust upstream of the turbine to the intake downstream of the compressor. An EGR valve may be positioned in the EGR passage (e.g., EGR valve 292). By opening the EGR valve, intake air drawn into the intake system by the electric booster may flow through the EGR passage to the exhaust, promoting flow of ambient air past the IAT sensor. Additionally or alternatively, the engine may be positioned (e.g., at the initial engine off-event or by rotating the engine with an electric motor) so that at least one cylinder of the engine has both of its intake and exhaust valves open. If the engine includes electronic valve actuation or other mechanism for controlling the cylinder valve position independent of engine position, the method may include opening the intake and exhaust valves of at least one cylinder. By having at least one cylinder with both its intake valve and exhaust valve open, ambient air drawn in by the electric booster may flow to the exhaust, promoting flow of the ambient air past the IAT sensor. Further, in some examples, a wastegate coupled across the turbine (e.g., wastegate 295) may be opened to provide a pathway for the air to flow around the turbine, preventing any blockage or stall to the flow of ambient air in the exhaust system. Additionally, the intake throttle (e.g., throttle 262) may be moved to the wide open position.

At 510, method 500 includes determine if the IAT has decreased to the AAT. The determination performed at 510 may be performed once the ambient air has flowed across the IAT sensor for a threshold duration, such as 30-60 seconds. During the time that the ambient air is flowed across the IAT sensor, the output from the IAT sensor and the AAT sensor may be monitored. If at 510 it is determined that the IAT (as measured by the IAT sensor) has decreased to the AAT (as measured by the AAT sensor), method 500 proceeds to 514 to indicate that the IAT and ECT are high due to engine heat, and a diagnostic code is not set. At 516, method 500 may optionally include confirming the ECT is rational at a next engine start, as described above with respect to FIG. 4. Owing to the large thermal mass of the coolant, the ECT may not decrease fast enough following the flow of ambient air though the intake and exhaust systems (and through the engine) to be detectable in the time frame for executing the diagnostic routine. Thus, it may be desirable to confirm that the ECT sensor is rational by monitoring the ECT as measured by the ECT sensor at the next engine-on event. Likewise, the converging of the IAT to the AAT may vindicate the AAT sensor, but it may be desirable to confirm the rationality of the AAT sensor as well. Thus, at 518, method 500 optionally includes confirming the AAT sensor is rational based on one or more obtained AATs in the vicinity of the vehicle. For example, the vehicle may be capable of obtaining one or more AATs measured by other AAT sensors of other vehicles within the vicinity of the vehicle (e.g., within a quarter mile or other suitable distance) via V2V technology. Further, the vehicle may be capable of obtaining weather data from a weather service (e.g., via GPS or V2I technology). If the AAT as measured by the AAT sensor is within a threshold of these obtained AATs in the vicinity (e.g., an average AAT as determined from the obtained AATs), the AAT sensor may be determined to be rational.

Returning to 510, if it is determined that the IAT (as measured by the IAT sensor) has not decreased to the AAT (as measured by the AAT sensor), method 500 proceeds to 512 to indicate that the IAT sensor is degraded and set a diagnostic code indicating the IAT sensor is degraded. The method 500 described herein may rely on an assumption that the AAT sensor is rational, as it is more likely that increased IAT and ECT relative to AAT is due to rejected engine heat than a sensor fault. However, it is possible that the AAT may be degraded and the IAT is accurately reading ambient air temperature, in which case flowing ambient air over the IAT sensor would not result in the IAT as measured by the IAT sensor converging with the AAT as measured by the AAT. Thus, in some examples, before or after indicating the IAT sensor is degraded, method 500 may confirm the AAT sensor is rational (e.g., by an obtained AAT in the vicinity of the vehicle, as described above). Thus, at least in some examples, upon determining the IAT sensor may be degraded, the method may proceed to 516 and/or 518 to confirm rationality of the ECT and/or AAT sensors. Method 500 then returns.

Thus, method 500 described herein provides a quick confirmation that temperature sensor divergence (where the AAT sensor is measuring an ambient temperature lower than temperatures measured by the IAT sensor and ECT sensor) is due to rejected engine heat, by exposing the IAT sensor to ambient air, while maintaining the engine in the engine-off state that the initial rationality test is conducted in. If the IAT measured by the IAT sensor converges with the AAT, the method may assume that the IAT sensor (and correspondingly the ECT sensor) is being exposed to engine heat and that none of the sensors are degraded. However, if the IAT sensor does not converge with AAT upon flowing the ambient air, a more in-depth check may be performed to confirm if the IAT sensor, AAT sensor, or ECT sensor is degraded (e.g., by comparing the AAT sensor output to an obtained AAT and by monitoring ECT at the next engine start up). Further, even if the IAT sensor is vindicated by converging with the AAT, the functionality of the AAT and ECT sensors may still confirmed as described above. While the functionality of the AAT sensor is described herein as being confirmed based on other measured AATs in the vicinity of the vehicle, such a confirmation may require the vehicle be connected to a network. If the vehicle is unable to obtain other AATs in the vicinity, another mechanism for confirming the functionality of the AAT sensor may be performed, such as repeating the rationality check at another time of day where the AAT is expected to be different.

FIG. 6 illustrates a method 600 for confirming if temperature measurement divergence among an AAT sensor, IAT sensor, and ECT sensor is due to one of the sensors being degraded or due to the AAT sensor being exposed to heat from the sun (e.g., solar loading). Method 600 may be performed in response to an initial rationality check performed on the sensors indicating that the AAT sensor is outputting a temperature measurement that is significantly more than the temperatures measured by the IAT sensor and ECT sensor. The higher temperature measurement from the AAT sensor may be due to the AAT sensor being degraded and thus inaccurately measuring ambient temperature, while the IAT sensor and ECT sensor are accurately measuring ambient temperature. However, the AAT sensor may be positioned on the vehicle at a location where the AAT sensor is prone to heating from the sun, while the IAT sensor and ECT sensor are not in a location that undergoes solar loading. This heat may cause the AAT sensor, but not the IAT sensor and the ECT sensor, to measure a temperature that is higher than actual ambient temperature. Thus, method 600 may be performed to confirm if a sensor is degraded or if the AAT sensor is being exposed to solar heat, thereby avoiding a false positive determination of sensor degradation.

At 602, method 600 includes confirming that the AAT sensor is rational. As explained above with respect to FIG. 5, it may be more likely that the AAT sensor is measuring a high temperature due to solar loading than due to the AAT sensor being degraded. To quickly overcome a false indication of AAT sensor degradation when the AAT sensor is outputting a measurement of ambient temperature that is higher than the temperatures measured by the IAT sensor and ECT sensor, the IAT sensor may be exposed to heat from a catalyst to cause the IAT sensor output to converge with the AAT sensor output. However, before doing so, the AAT sensor may be pre-checked via a secondary rationality check to confirm that it is rational. The pre-check of the AAT sensor may include comparing the AAT as measured by the AAT sensor to one or more obtained AATs in the vicinity of the vehicle, as explained above with respect to FIG. 5. If network connectivity is not possible (and/or if the vehicle is not in a location where AATs in the vicinity are available, such as in a remote area), the pre-check of the AAT sensor may include obtaining the time of day that the pre-check/rationality test is being conducted (e.g., from a clock of the vehicle). If the pre-check is being conducted during the day, when the sun is up and could conceivably be heating the AAT sensor, the rationality check may be redone at a different time when the sun is down. If the pre-check is being conducted at night when the sun is not up and thus it is unlikely the AAT sensor is undergoing solar loading, the AAT sensor may be assumed to be degraded but the method may still be performed to ensure the IAT sensor and ECT sensor are rational.

At 604, method 600 includes determining if the AAT is rational. If the AAT sensor is not rational, method 600 proceeds to 606 to indicate that the divergence among the sensors is due to the AAT sensor being degraded, and a diagnostic code is set indicating the AAT sensor is degraded. Method 600 then returns. If the AAT sensor is rational, method 600 proceeds to 608 to determine if a catalyst temperature is greater than the AAT or IAT. The catalyst temperature may be measured by an exhaust gas temperature (EGT) sensor, such as sensor 226 or sensor 229, located proximate a catalyst (e.g., catalyst 270) positioned in the exhaust system. Because the catalyst is operated at a high temperature to convert emissions in the exhaust from the engine, the catalyst may remain at a temperature above ambient temperature even after the soak duration. Thus, as described below, the heat from the catalyst may be transferred to the IAT sensor to confirm the IAT sensor is functional and vindicate the AAT sensor. If the catalyst temperature is not greater than the AAT or IAT, sufficient heat is not available to send to the IAT sensor. Thus, method 600 proceeds to 610 to confirm the IAT sensor is rational at a different time, such as at a next engine start-up. For example, due to compression of the intake air during engine operation as well as heat rejection from the engine (and also due to EGR, if the engine system includes an EGR system), the intake air flowing past the IAT sensor may be warmer than ambient temperature, at least during some conditions. Thus, the rationality of the IAT sensor may be confirmed by monitoring the IAT sensor output as the engine is started and operates with combustion. If the IAT as measured by the IAT sensor increases as the engine operates, the IAT sensor may be determined to be rational. Method 600 then returns.

If the catalyst temperature is greater than the AAT or IAT, method 600 proceeds to 612 to confirm the IAT sensor is rational using heat from the catalyst. To confirm the IAT sensor is rational, method 600 includes reverse rotating the engine, as indicated at 614. The engine may be rotated in reverse with an electric motor, using the H-bridge as described above with respect to FIGS. 3A and 3B. The reverse rotation of the engine draws in air through the exhaust system, through and/or around the engine, and past the IAT sensor, as indicated at 616. The air flows through the catalyst, where the air is heated (and prior to that, where stagnant air that has been held in the catalyst is swept to the IAT sensor) and thus heat from the catalyst is transferred to the IAT sensor. While the engine is reverse rotated, the IAT sensor output is monitored for a duration (e.g., 30-60 seconds). To promote flow of air through the exhaust system, through or around the engine, and past the IAT sensor, the wastegate may be opened, the EGR valve may be opened, and/or the intake throttle may be opened.

At 618, method 600 includes determining if the IAT (measured by the IAT sensor) converges with the AAT (measured by the AAT sensor). If the IAT does not converge with the AAT (e.g., if the temperature measured by the IAT sensor does not increase), method 600 proceeds to 620 to indicate that the IAT sensor is degraded and set a diagnostic code. If the IAT does converge with the AAT, method 600 proceeds to 622 to indicate that the IAT sensor is rational. The convergence of the IAT sensor output with the AAT sensor output (along with the pre-check of the AAT sensor) also vindicates the AAT sensor. However, the ECT may also be confirmed as being rational at 624, for example by monitoring the ECT sensor output at the next engine start-up.

Thus, method 600 described herein provides a quick confirmation that temperature sensor divergence (where the AAT sensor is measuring an ambient temperature higher than temperatures measured by the IAT sensor and ECT sensor) is due to solar loading of the AAT sensor, by exposing the IAT sensor to heated air, while maintaining the engine in the engine-off state that the initial rationality test is conducted in. If the IAT measured by the IAT sensor converges with the AAT, the method may assume that the AAT sensor is being exposed to solar heat and that none of the sensors are degraded. If the IAT sensor does not converge with AAT upon flowing the ambient air, the method may assume the IAT sensor is degraded. However, both of these may be confirmed by a pre- or secondary rationality check that may confirm if the AAT sensor or ECT sensor is degraded (e.g., by comparing the AAT sensor output to an obtained AAT in the vicinity and by monitoring ECT at the next engine start up). Further, even if the IAT sensor is vindicated by converging with the AAT, the functionality of the AAT and ECT may still confirmed as described above. While the functionality of the AAT sensor is described herein as being confirmed based on other measured AATs in the vicinity of the vehicle, such a confirmation may require the vehicle be connected to a network. If the vehicle is unable to obtain other AATs in the vicinity, another mechanism for confirming the functionality of the AAT sensor may be performed, such as repeating the rationality check at another time of day where the AAT is expected to be different.

In both methods 500 and 600, an indication of sensor degradation results in a diagnostic code being set. Such a code may allow a technician or other service professional to quickly determine that the degraded sensor is to be replaced. However, other actions are possible in response to determining a sensor is degraded, such as lighting a malfunction indictor lamp (to notify an operator of the vehicle) and/or adjusting engine operation. For example, if the AAT sensor is determined to be degraded, evaporative emissions leak tests may be performed based on IAT rather than AAT. Likewise, enrichment of air-fuel ratio at start-up may be determined based on an alternate AAT, such an estimate from the IAT sensor or an AAT obtained from a remote source, such as another vehicle or a weather service. If an IAT sensor is degraded, engine controls that rely on the IAT may be adjusted to use an estimated IAT (e.g., estimated based on AAT and engine parameters, such as EGR rate and boost level).

Figure 7:
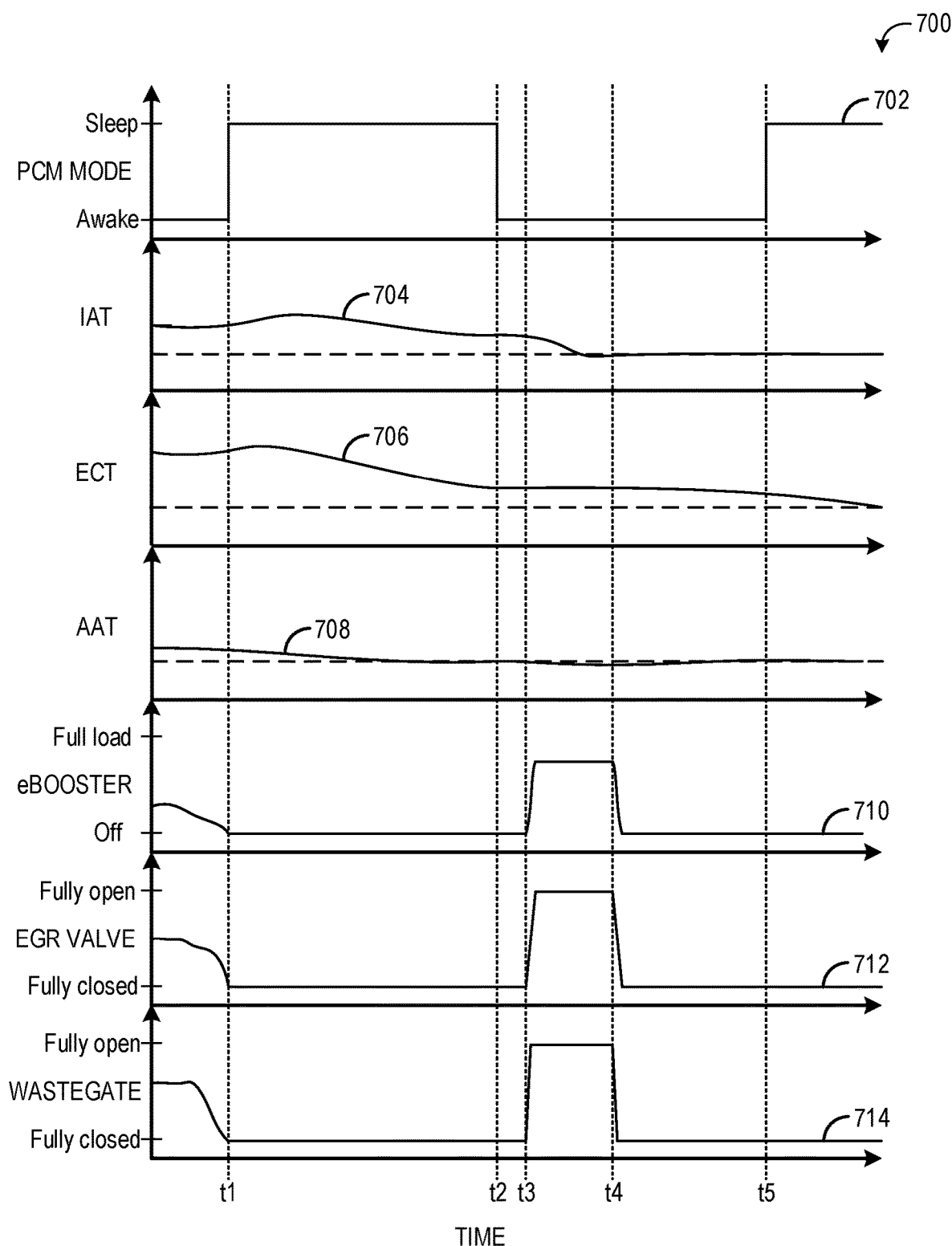
FIGS. 7-8 are example timing diagrams illustrating operating parameters of interest during execution of the methods described herein.

FIG. 7 is a timing diagram 700 showing example operating parameters during the execution of method 400 and 500, for example. Diagram 700 includes a plot illustrating a PCM mode (the status of which includes a sleep mode and an awake mode, represented by curve 702), a plot illustrating intake air temperature as measured by the IAT sensor (represented by curve 704), a plot depicting engine coolant temperature as measured by the ECT sensor (represented by curve 706), a plot depicting ambient air temperature as measured by the AAT sensor (represented by curve 708), electric booster status (represented by curve 710), EGR valve position (represented by curve 712), and wastegate position (represented by curve 714). For each plot, time is plotted along the x-axis and respective values for each parameter are plotted along the y-axis. For the electric booster status, the values along the y-axis start from the booster being off and extend to the booster being at full load. For the EGR valve position and wastegate position, the values along the y-axes start at fully closed and extend to fully open (with positions between fully closed and fully open being represented in between). The plots are all time-aligned, and thus events occurring at the same point along the x-axes are understood to be occurring simultaneously.

Prior to time t1, the vehicle is operating. As such, the PCM is awake. Both IAT and ECT may be larger than AAT, owing to heat generation by various engine components. The ECT may be larger than the IAT. The electric booster is operated at a load that is lower than full load and decreases in load as time advances toward t1. Likewise, both the EGR valve and wastegate are open at a position that is between fully closed and fully open to provide demanded EGR and boost pressure, for example. At a time that is slightly before time t1, the vehicle is shut off. At time t1, the PCM shifts to the sleep mode. Before time t1, but once the vehicle is shut off, the electric booster is deactivated and the EGR valve and wastegate are each moved to the fully closed position. Prior to time t1, each of the IAT, ECT, and AAT is relatively steady.

From time t1 through time t2, the engine and the vehicle remain off (referred to as engine soak). As a result, the IAT and the ECT decrease in temperature as the engine heat dissipates to atmosphere. Over the course of the engine soak, the AAT may also decrease a small amount (e.g., the engine soak may be occurring at night). The time from t1 to t2 is shown as being relatively short (relative to the other events shown in diagram 700) for clarity purposes, but it is to be understood that t1 and t2 may be separated by a soak duration of six hours, for example.

At time t2, the soak duration has elapsed without an intervening engine start. Thus, the rationality check is initiated by switching the PCM to the awake mode and comparing the IAT, ECT, and AAT to each other. At time t2, the IAT and the ECT are each greater than the AAT (the AAT at time t2 is shown all the three temperature plots as a dashed line for visual purposes). Thus, the divergence among the sensors may due to sensor degradation or due to the engine still rejecting heat to the IAT sensor and ECT sensor. To determine which, at time t3, the electric booster is activated to flow ambient air over the IAT sensor. The electric booster is activated at a load that is less than full load, but greater than no load. In an example, the electric booster may be operated at a load of 30%, or in a range of 20-40% load. By operating at such a load, undue drain on the vehicle battery may be avoided while still flowing a sufficient amount of ambient air to carry out the rationality check. Further, noise, vibration, and harshness issues may be avoided.

At the same time, the EGR valve and wastegate may each be moved to the respective fully open position. Thus, ambient air flows over the IAT sensor from t3 to time t4. The flow of ambient air results in the IAT as measured by the IAT sensor decreasing to the AAT (the ECT may remain higher than the AAT due to the thermal properties of the coolant). At t4, the electric booster is deactivated and the EGR valve and wastegate are moved back to the fully closed positions. The IAT, ECT, and AAT may be monitored for a duration following t4, or the IAT, ECT, and AAT may be measured and compared to each other at or before t4. In either case, by t4, the IAT is equal to the AAT, and thus no sensor degradation is indicated. At time t5, the PCM resumes the sleep mode.

Figure 8:
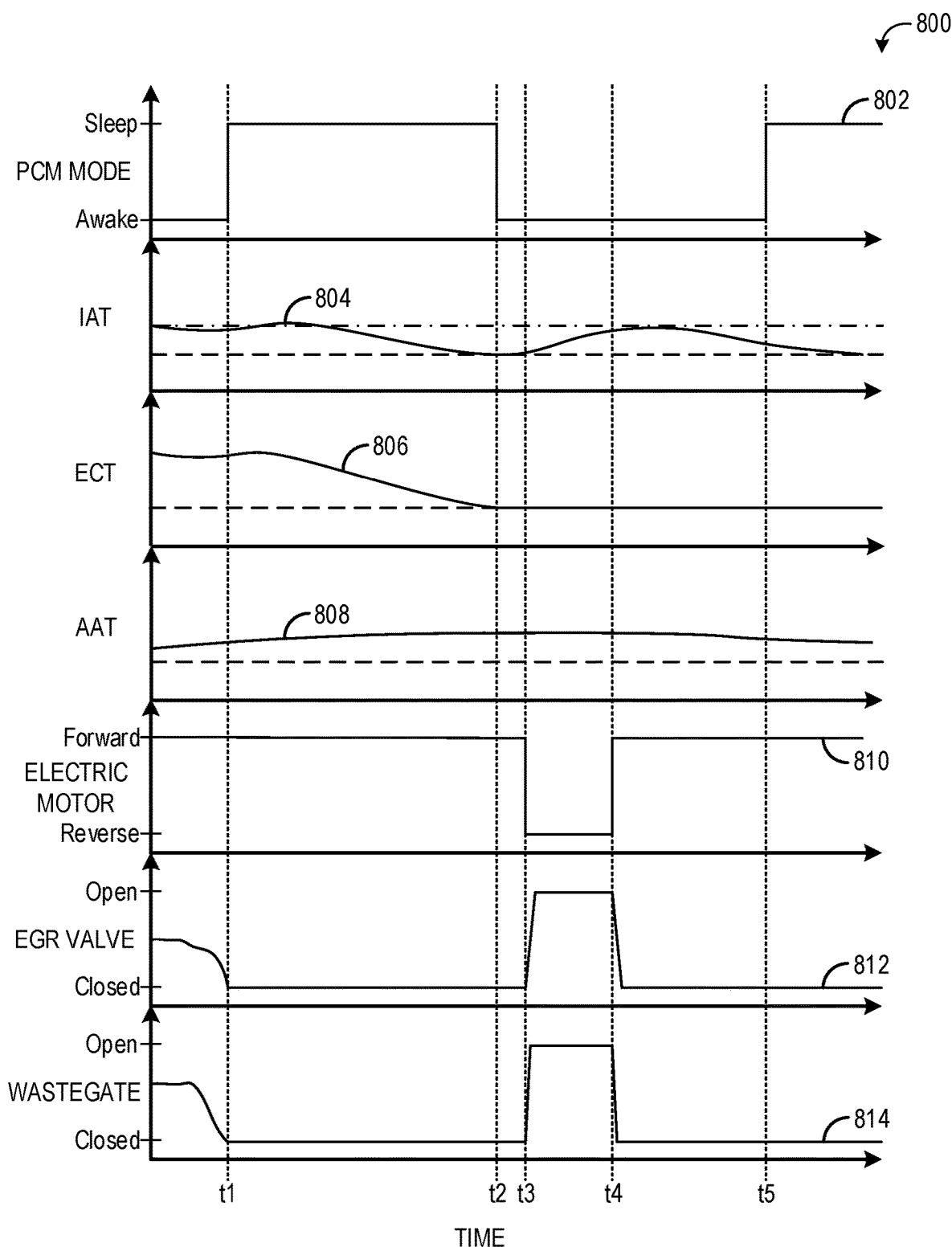

FIG. 8 is a timing diagram 800 showing example operating parameters during the execution of method 400 and 600, for example. Diagram 800 includes a plot illustrating a PCM mode (the status of which includes a sleep mode and an awake mode, represented by curve 802), a plot illustrating intake air temperature as measured by the IAT sensor (represented by curve 804), a plot depicting engine coolant temperature as measured by the ECT sensor (represented by curve 806), a plot depicting ambient air temperature as measured by the AAT sensor (represented by curve 808), electric motor directional status (represented by curve 810), EGR valve position (represented by curve 812), and wastegate position (represented by curve 814). For each plot, time is plotted along the x-axis and respective values for each parameter are plotted along the y-axis. For the electric motor directional status, the values along the y-axis include rotational capabilities in the forward direction and rotational capabilities in the reverse direction. For the EGR valve position and wastegate position, the values along the y-axes start at fully closed and extend to fully open (with positions between fully closed and fully open being represented in between). The plots are all time-aligned, and thus events occurring at the same point along the x-axes are understood to be occurring simultaneously.

Prior to time t1, the vehicle is operating. As such, the PCM is awake. Both IAT and ECT may be larger than AAT, owing to heat generation by various engine components. The ECT may be larger than the IAT. The electric motor may be in the forward-rotating configuration, where the motor is capable of rotating the engine in a forward direction (as during an engine start), however the motor may not be activated. Both the EGR valve and wastegate are open at a position that is between fully closed and fully open to provide demanded EGR and boost pressure, for example. At a time that is slightly before time t1, the vehicle is shut off. At time t1, the PCM shifts to the sleep mode. Before time t1, but once the vehicle is shut off, the EGR valve and wastegate are each moved to the fully closed position. Prior to time t1, each of the IAT and ECT is relatively steady, and AAT as measured by the AAT sensor is increasing by a small amount.

From time t1 through time t2, the engine and the vehicle remain off (referred to as engine soak). As a result, the IAT and the ECT decrease in temperature as the engine heat dissipates to atmosphere. Over the course of the engine soak, the AAT (as measured by the AAT sensor, if the AAT sensor was being sampled during the engine soak) may continue to increase by a small amount due to heating by the sun. The time from t1 to t2 is shown as being relatively short (relative to the other events shown in diagram 800) for clarity purposes, but it is to be understood that t1 and t2 may be separated by a soak duration of six hours, for example.

At time t2, the soak duration has elapsed without an intervening engine start. Thus, the rationality check is initiated by switching the PCM to the awake mode and comparing the IAT, ECT, and AAT to each other. At time t2, the IAT and the ECT are each less than the AAT (the actual AAT is shown on all the three temperature plots as a dashed line for visual purposes). Thus, the divergence among the sensors may due to sensor degradation or due to the solar loading on the AAT sensor. To determine which, at time t3, the electric motor is switched to the reverse rotating configuration and the engine is rotated in reverse.

At the same time, the EGR valve and wastegate may each be moved to the respective fully open position. Thus, heated air from the catalyst flows over the IAT sensor from t3 to time t4. The flow of heated air results in the IAT as measured by the IAT sensor increasing to the AAT as measured by the AAT sensor, which is shown by the dashed-dotted line (the ECT may remain lower than the AAT due to the thermal properties of the coolant). At t4, the engine is no longer rotated and the electric motor is returned to the forward configuration. The EGR valve and wastegate are moved back to the fully closed positions. The IAT, ECT, and AAT may be monitored for a duration following t4, or the IAT, ECT, and AAT may be measured and compared to each other at or before t4. In either case, by time t4, the IAT is equal to the AAT, and thus no sensor degradation is indicated. At time t5, the PCM resumes the sleep mode.

In this way, environmental temperature conditions that may differentially affect the engine-based temperature sensors (the IAT sensor and the ECT sensor) and the ambient temperature sensor may be accounted for, thereby avoiding false positive identification of AAT sensor faults. The technical effect of determining if temperature sensor divergence is due to sensor fault or due to environmental temperature conditions (e.g., rejected engine heat or solar loading) is reduced false positive determinations of sensor faults. Another technical effect is the ability to more accurately identify sensor faults, thereby allowing tolerated temperature differences to be lowered. For example, current rationality tests may indicate all the temperature sensors are in agreement if each sensor measures a temperature within 50° F. of the other two temperature sensors. However, by allowing solar loading or engine heat effects to be accounted for, the tolerated temperature divergence may be lowered to 10 or 20° F., for example, thus allowing for more accurate and rapid detection of actual temperature sensor faults and subsequent adjustment to engine operating parameters that are based on the output of the temperature sensors.

An example relates to a method for a vehicle. The method includes, at a duration after an engine-off event and in response to an intake air temperature (IAT) measured by an IAT sensor of the vehicle being greater than an ambient air temperature (AAT) measured by an AAT sensor of the vehicle, flowing ambient air across the IAT sensor, and indicating the AAT sensor is functional responsive to the IAT converging to the AAT during the flowing. In a first example of the method, flowing the ambient air includes activating an electronic booster positioned upstream of the IAT sensor. In a second example of the method, which optionally includes the first example, flowing the ambient air further includes one or more of opening an exhaust gas recirculation valve, opening a wastegate, and positioning an engine of the vehicle at the engine-off event such that at least one cylinder of the engine includes an open exhaust valve and an open intake valve. In a third example of the method, which optionally includes one or both of the first and second examples, the duration after the engine-off event comprises a predetermined duration having elapsed without an intervening engine start. In a fourth example of the method, which optionally includes one or more or each of the first through third examples, the predetermined duration is in a range of four to six hours. In a fifth example of the method, which optionally includes one or more or each of the first through fourth examples, the intake air temperature being greater than the ambient air temperature comprises the intake air temperature being greater than the ambient air temperature by a threshold amount or greater. In a sixth example of the method, which optionally includes one or more or each of the first through fifth examples, the threshold amount comprises 30° F. In a seventh example of the method, which optionally includes one or more or each of the first through sixth examples, the method further includes, responsive to the IAT measured by IAT sensor remaining above the AAT during the flowing: obtaining an ambient temperature in a vicinity of the vehicle; if the ambient temperature is within a threshold of the AAT measured by the AAT sensor, indicating the IAT sensor is degraded; and if the ambient temperature is not within the threshold of the AAT measured by the ambient air temperature sensor, indicating the AAT sensor is degraded. In an eighth example of the method, which optionally includes one or more or each of the first through seventh examples, obtaining the ambient temperature in the vicinity of the vehicle comprises one or more of obtaining one or more ambient temperature measurements from one or more neighboring vehicles and obtaining an ambient temperature measurement from a remote service. In a ninth example of the method, which optionally includes one or more or each of the first through eighth examples, the method further includes, responsive to indicating the AAT sensor is degraded, adjusting one or more engine operating parameters for a subsequent engine operating period.

An example relates to a hybrid vehicle system. The hybrid vehicle system includes a vehicle including an engine; an electric motor coupled to a battery and capable of propelling the vehicle; an intake air temperature (IAT) sensor positioned in an intake manifold of the engine; an ambient air temperature (AAT) sensor positioned on external component of the vehicle; an electric booster positioned in an intake passage upstream of the engine; and a controller storing computer readable instructions in non-transitory memory. The instructions are executable to: at a predetermined duration after an engine-off event and responsive to an intake air temperature measured by the IAT sensor being greater than an ambient air temperature measured by the AAT sensor by at least a threshold amount, activate the electric booster to flow ambient air across the IAT sensor; and upon activating the electric booster, indicate the AAT sensor is functional responsive to the intake air temperature converging to the ambient air temperature. In a first example of the system, the predetermined duration after the engine-off event comprises a predetermined duration having elapsed without an intervening engine start. In a second example of the system, which optionally includes the first example, the electric booster is activated to flow the ambient air across the IAT while the vehicle is propelled by the electric motor and the engine is off. In a third example of the system, which optionally includes one or both of the first and second examples, the instructions are further executable to, responsive to the intake air temperature measured by the intake air temperature sensor remaining above the ambient air temperature upon activating the electric booster: obtain an ambient temperature in a vicinity of the vehicle; if the ambient temperature is within a threshold of the ambient air temperature measured by the ambient air temperature sensor, indicate the intake air temperature sensor is degraded; and if the ambient temperature is not within the threshold of the ambient air temperature measured by the ambient air temperature sensor, indicate the ambient air temperature sensor is degraded. In a fourth example of the system, which optionally includes one or more of each of the first through third examples, obtaining the ambient temperature in the vicinity of the vehicle comprises one or more of obtaining one or more ambient temperature measurements from one or more neighboring vehicles and obtaining an ambient temperature measurement from a remote service.

Another example provides a method, including waking a control module of a vehicle after an engine soak of a predetermined duration; upon waking the control module, performing, with the control module, a rationality test of an intake air temperature sensor, ambient air temperature sensor, and an engine temperature sensor of the vehicle; responsive to the rationality test indicating an ambient air temperature measured by the ambient air temperature sensor is lower than an intake air temperature measured by the intake air temperature sensor, determining if divergence between the intake air temperature sensor and the ambient air temperature sensor is due to retained engine heat or due to a degraded sensor by activating an electric booster positioned upstream of an engine of the vehicle to flow ambient air across the intake air temperature sensor; upon activating the electric booster, if the intake air temperature measured by the intake air temperature sensor converges with the ambient air temperature measured by the ambient air temperature sensor, indicating the divergence is due to retained engine heat; and upon activating the electric booster, if the intake air temperature measured by the intake air temperature sensor does not converge with the ambient air temperature measured by the ambient air temperature sensor, indicating the divergence is due to a degraded sensor, and identifying the degraded sensor by performing a secondary rationality check. In a first example of the method, performing the secondary rationality check comprises: obtaining an ambient temperature measurement in a vicinity of the vehicle; if the ambient temperature measurement in the vicinity of the vehicle is within a threshold of the ambient air temperature measured by the ambient air temperature sensor, identifying the intake air temperature sensor is the degraded sensor; and if the ambient temperature measurement in the vicinity of the vehicle is not within a threshold of the ambient air temperature measured by the ambient air temperature sensor, identifying the ambient air temperature sensor is the degraded sensor. In a second example of the method, which optionally includes the first example, performing the secondary rationality check comprises: monitoring the intake air temperature measured by the intake air temperature sensor over a duration following a subsequent engine start; if the intake air temperature increases by a threshold rate over the duration, identifying the ambient air temperature sensor is the degraded sensor; and if the intake air temperature does not increase by the threshold rate over the duration, identifying the intake air temperature sensor is the degraded sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
at a duration after an engine-off event,
in response to an intake air temperature (IAT) measured by an IAT sensor of the vehicle being less than an ambient air temperature (AAT) measured by an AAT sensor of the vehicle,
flowing air from exhaust system of the vehicle to the IAT sensor;
responsive to the IAT converging with the AAT during flowing air from exhaust system to the IAT sensor, indicating the IAT sensor is functional; and
responsive to the IAT remaining below the AAT during flowing air from exhaust system to the IAT sensor, indicating the IAT sensor is degraded; and
in response to the IAT measured by the IAT sensor being greater than the AAT measured by the AAT sensor,
flowing ambient air across the IAT sensor;
responsive to the IAT converging with the AAT during flowing ambient air across the IAT sensor, indicating the AAT sensor and the IAT sensor are functional; and
responsive to the IAT measured by the IAT sensor remaining above the AAT during flowing ambient air across the IAT sensor:
obtaining an ambient temperature in a vicinity of the vehicle;
if the ambient temperature is within a threshold of the AAT measured by the AAT sensor, indicating the IAT sensor is degraded; and
if the ambient temperature is not within the threshold of the AAT measured by the AAT, indicating the AAT sensor is degraded.

2. The method of claim 1, wherein flowing air from the exhaust system includes reversing rotation of an engine of the vehicle via an electric motor, and flowing the ambient air includes activating an electronic booster positioned upstream of the IAT sensor.

3. The method of claim 2, wherein flowing the ambient air further includes one or more of opening an exhaust gas recirculation valve, opening a wastegate, and positioning the engine at the engine-off event such that at least one cylinder of the engine includes an open exhaust valve and an open intake valve.

4. The method of claim 1, wherein the duration after the engine-off event comprises a predetermined duration having elapsed without an intervening engine start.

5. The method of claim 4, wherein the predetermined duration is in a range of four to six hours.

6. The method of claim 1, wherein the IAT being greater than the AAT comprises the IAT being greater than the AAT by a threshold amount or greater.

7. The method of claim 6, wherein the threshold amount comprises 30° F.

8. The method of claim 1, wherein obtaining the ambient temperature in the vicinity of the vehicle comprises one or more of obtaining one or more ambient temperature measurements from one or more neighboring vehicles and obtaining an ambient temperature measurement from a remote service.

9. The method of claim 1, further comprising responsive to indicating the AAT sensor is degraded, adjusting one or more engine operating parameters for a subsequent engine operating period.

10. A hybrid vehicle system, comprising:
a vehicle including an engine;
an electric motor coupled to a battery and capable of propelling the vehicle;
an intake air temperature (IAT) sensor positioned in an intake manifold of the engine;
an ambient air temperature (AAT) sensor positioned on external component of the vehicle;
an electric booster positioned in an intake passage upstream of the engine;
an exhaust system positioned downstream of the engine; and
a controller storing computer readable instructions in non-transitory memory executable to:
at a predetermined duration after an engine-off event,
responsive to an IAT measured by the IAT sensor being less than an AAT measured by the AAT sensor, flow air from the exhaust system to the IAT sensor, and indicate the IAT sensor is degraded in response to the IAT remaining below the AAT; and
responsive to the IAT being greater than the AAT by at least a threshold amount,
activate the electric booster to flow ambient air across the IAT sensor;
responsive to the IAT converging with the AAT upon activating the electric booster, indicate the AAT sensor is functional; and
responsive to the IAT measured by the IAT remaining above the AAT upon activating the electric booster:
obtain an ambient temperature in a vicinity of the vehicle;
if the ambient temperature is within a threshold of the AAT measured by the AAT sensor, indicate the IAT sensor is degraded; and
if the ambient temperature is not within the threshold of the AAT measured by the AAT sensor, indicate the AAT sensor is degraded.

11. The hybrid vehicle system of claim 10, wherein the predetermined duration after the engine-off event comprises a predetermined duration having elapsed without an intervening engine start.

12. The hybrid vehicle system of claim 11, wherein the electric booster is activated to flow the ambient air across the IAT while the vehicle is propelled by the electric motor and the engine is off.

13. The hybrid vehicle system of claim 10, wherein obtaining the ambient temperature in the vicinity of the vehicle comprises one or more of obtaining one or more ambient temperature measurements from one or more neighboring vehicles and obtaining an ambient temperature measurement from a remote service.

14. A method, comprising:
waking a control module of a vehicle after an engine soak of a predetermined duration;
upon waking the control module, performing, with the control module, a diagnostic of an intake air temperature (IAT) sensor, ambient air temperature (AAT) sensor, and an engine temperature sensor of the vehicle;
responsive to the diagnostic indicating an AAT measured by the AAT sensor is greater than an IAT measured by the IAT sensor, determining if divergence between the IAT sensor and the AAT sensor is due to solar loading or due to a degraded sensor by flowing air from an exhaust system of the engine to the IAT sensor;
responsive to the diagnostic indicating the AAT measured by the AAT sensor is lower than the IAT measured by the IAT sensor, determining if divergence between the IAT sensor and the AAT sensor is due to retained engine heat or due to a degraded sensor by activating an electric booster positioned upstream of an engine of the vehicle to flow ambient air across the IAT sensor;
upon activating the electric booster, if the IAT measured by the IAT sensor converges with the AAT measured by the AAT sensor, indicating the divergence is due to retained engine heat; and
upon activating the electric booster, if the IAT measured by the IAT sensor does not converge with the AAT measured by the AAT sensor, indicating the divergence is due to a degraded sensor, and identifying the degraded sensor by performing a secondary rationality check,
wherein performing the secondary rationality check comprises:
obtaining an ambient temperature measurement in a vicinity of the vehicle;
if the ambient temperature measurement in the vicinity of the vehicle is within a threshold of the AAT measured by the AAT sensor, identifying the IAT sensor is the degraded sensor; and
if the ambient temperature measurement in the vicinity of the vehicle is not within a threshold of the AAT measured by the AAT sensor, identifying the AAT sensor is the degraded sensor.

15. The method of claim 14, wherein performing the secondary rationality check comprises:
monitoring the IAT measured by the IAT sensor over a duration following a subsequent engine start;
if the IAT increases by a threshold rate over the duration, identifying the AAT sensor is the degraded sensor; and
if the IAT does not increase by the threshold rate over the duration, identifying the IAT sensor is the degraded sensor.

* * * * *